235-379 SR

3/15/88 OR 4,731,523

United States Patent [19]

Kozima

[11] Patent Number: 4,731,523

[45] Date of Patent: Mar. 15, 1988

[54] BILL RECEIVING DEVICE

[75] Inventor: Susuma Kozima, Sakado, Japan

[73] Assignee: Kabushiki Kaisha SG, Tokyo, Japan

[21] Appl. No.: 892,496

[22] Filed: Aug. 1, 1986

[30] Foreign Application Priority Data

Aug. 7, 1985 [JP] Japan ................................ 60-172292

Sep. 25, 1985 [JP] Japan ................................ 60-210043

[51] Int. Cl.[4] ............................................. G06F 15/30

[52] U.S. Cl. .................................................... 235/379

[58] Field of Search ........................................ 235/379

[56] References Cited

U.S. PATENT DOCUMENTS 4,625,780 12/1986 Nao .................................... 235/379

*Primary Examiner*—Harold I. Pitts

*Attorney, Agent, or Firm*—Spensley Horn Jubas & Lubitz

[57] ABSTRACT

A bill passage is provided in about the central portion of an elongated casing and spaces on both sides of this bill passage constitute first and second bill receiving chambers. For enabling a bill received therein to be paid out according to necessity, at least the first bill receiving chamber has a bill outlet. A bill pushing member can move in a reciprocating motion between the first and second bill receiving chambers across the bill passage. When a bill delivered to a predetermined position in the bill passage is received in the first bill receiving chamber, the bill is received by pushing it with a first surface of the bill pushing member while the bill pushing member is moved from the second bill receiving chamber towards the first bill receiving chamber. When the bill is received in the second bill receiving chamber, the bill is received by pushing it with a second surface of the bill pushing member which is opposite to the first surface while the bill pushing member is moved from the first bill receiving chamber towards the second bill receiving chamber. A bill payout mechanism comprising rollers and a motor for driving these rollers is provided in the bill pushing member. The rollers are exposed at least on the first surface of the bill pushing member. When a bill is paid out of the bill receiving chamber, the bill pushing member is positioned at a predetermined position at which the first surface of the bill pushing member comes into pressing contact with a surface of a stack of bills in the bill receiving chamber and a bill which is in contact with the rollers is fed to the bill outlet by driving the rollers in this state.

8 Claims, 17 Drawing Figures

BILL RECEIVING DEVICE

BACKGROUND OF THE INVENTION

This invention relates to a bill receiving device in a bill device used for a vending machine or a money exchanger.

A bill device used for a vending machine or a money exchanger consists generally of a bill discrimination device for discriminating whether a deposited bill is a true bill or a false one as well as denomination thereof and a bill receiving device for receiving a bill which has been accepted as a true bill by the bill discrimination device. Known in the art are various bill receiving devices. A bill receiving device capable of paying out a once received bill per se is known. Also known is a bill receiving device capable of stacking bills of two different denominations separately. These prior art bill receiving devices having special functions have a common defect that they are obliged to adopt a relatively large-scale construction. In the bill receiving device capable of paying out a once received bill, for example, a largescale bill payout mechanism is required. In the bill receiving device capable of stacking bills of two different denominations separately, separate receiving structures and mechanisms are required for the respective denominations.

Known also is a vending machine in which both a bill and a prepaid credit voucher can be used. There has however been no known vending machine in which bills of many kinds of denominations can be used and besides a bill of a specific necessary denomination can be paid out as a change.

SUMMARY OF THE INVENTION

It is, therefore, an object of the present invention to provide a bill receiving device capable of dividing bills into two kinds and receiving the divided bills separately with a very compact construction and, besides, with respect to a bill of at least one specific denomination, capable of paying it out as required by means of a payout mechanism of an extremely simple construction.

It is another object of the invention to provide a bill receiving device capable of stacking bills of two kinds by denomination and paying out bills of both denominations respectively if required.

It is still another object of the invention to provide a bill receiving device which is of an extremely simple and compact construction and yet is capable of performing a special function of receiving many kinds of bills and prepaid credit vouchers or the like and paying out a bill with respect to a specific necessary denomination by receiving bills of one specific denomination which is to be paid out as a change exclusively in one bill receiving chamber and receiving bills of other denomination or denominations and credit vouchers (hereinafter referred to simply as "bill") all toghether in the other bill receiving chamber.

For achieving the above described objects, the bill receiving device according to the invention is characterized in that it comprises a bill passage, conveying meand for cnveying a bill delivered to said bill passage to a predetermined position for receiving it, first and second bill receiving chambers formed on both sides of said bill passage, at least said first bill receiving chamber having a bill outlet, a bill pushing member being capable of moving in a reciprocating motion across said first and second bill receiving chambers through said bill passage and, when the bill located at the predetermined position in said bill passage is to be received in said first bill receiving chamber, effects receiving of the bill by pushing it with a first surface of said bill pushing member while moving from said second bill receiving chamber towards said first bill receiving chamber and, when the bill is to be recieved in said second bill receiving chamber, effects receiving of the bill by pushing it with a second surface of said bill pushing member which is opposite to said first surface while moving from said first bill receiving chamber towards said second bill receiving chamber, and a bill payout mechanism provided in said bill pushing member and having a bill conveying member exposed on at least said first surface of said bill pushing member, a bill which is in contact with said bill conveying member being fed to said bill outlet by driving said bill conveying member.

Since two bill receiving chambers are provided on both sides of the bill passage and different kinds of bills are received in the respective chambers, the two bill receiving chambers can be constructed of an integral bill receiving structure so that an extremely compact construction can be adopted. Further, by adopting the arrangement that the bill pushing member which performs the pushing operation for receiving bills in the bill receiving chambers reciprocates between the two bill receiving chambers through the centrally located bill passage, the bill pushing member can be used commonly for receiving bills in the respective bill receiving chambers whereby necessity for providing a bill receiving mechanism in each of the bill receiving chambers is obviated so that the structure can be simplified. Further, the provision of the bill payout mechanism in the bill pushing member enables the construction of the bill payout mechanism to be simplified and thereby contributes substantially to making the bill receiving device as a whole small and compact.

An arrangement may be made so that the first and second bill receiving chambers respectively have the bill outlets and the bill conveying member is exposed respectively on the first and second surfaces of the bill pushing member. By this arrangement, bills of two different denominations can be stacked by denomination and bills of both denominations can be respectively paid out if necessary.

Alternatively, the first bill receiving chamber only may have the bill outlet and the bill conveying member of the bill payout mechanism may be exposed only on the first surface of the bill pushing member. In this case, bills of one specific denomination which are to be paid out as a change if required may be exclusively received in the first bill receiving chamber and bills of other denomination or denominations and credit vouchers (hereinafter referred to simply as bills) may be received all together in the second bill receiving chamber. Accordingly, the bill receiving device according to the invention is suitable for handling bills and credit vouchers of many kinds.

Preferred embodiments of the bill receiving device according to the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
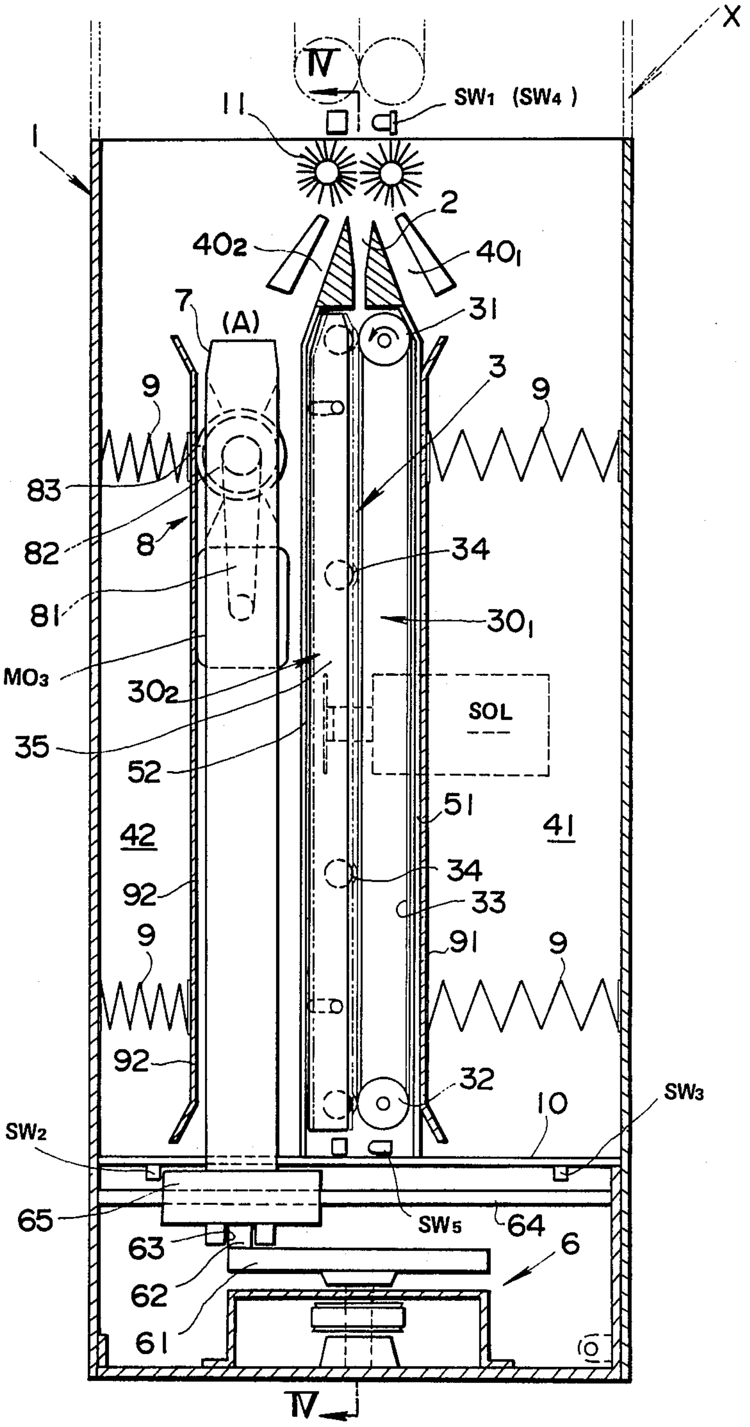
FIG. 1 is a sectional side view showing an embodiment of the bill receiving device of the invention.
Figure 2:
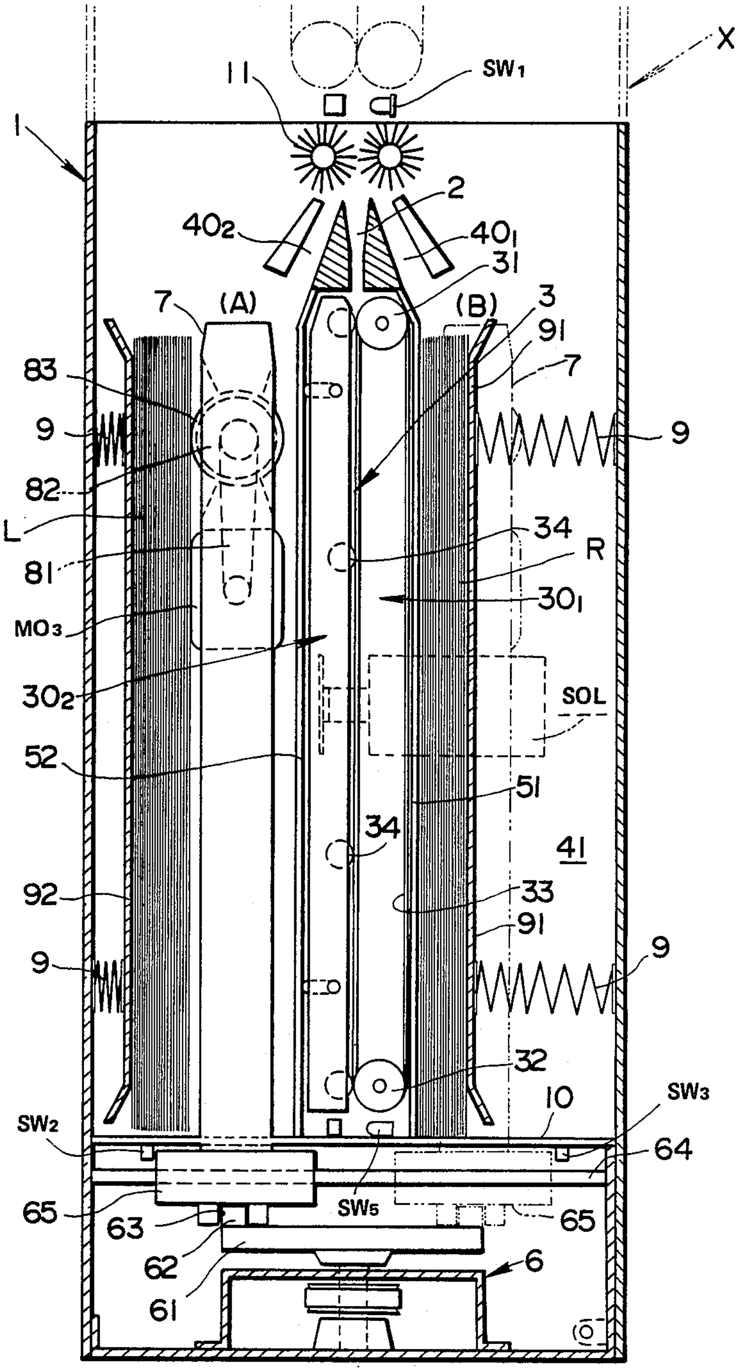
FIG. 2 is a sectional side view showing a state in which a suitable amount of bills are stacked in the same embodiment.

The bill receiving device shown in FIGS. 1 through 4 receives two kinds of bills separately and in such a manner that both kinds of bills can be paid out respectively.

The outline of the device will be briefly described first. This bill receiving device is located in the lower half of a bill device main body. In the upper half of the bill device is disposed a bill discrimination device X. This bill receiving device consists of an elongated casing 1 in which a bill entrance 2 is formed in about the center of the upper portion thereof. Under this bill entrance 2 is provided a bill passage 3 which is slightly longer than the longer side of a bill and functions to carry the bill downwardly, holding it on both surfaces thereof. Front and rear spaces definced by this bill passage 3 constitute bill receiving chambers 41 and 42. Bill outlets $40_1$ and $40_2$ are respectively formed above the bill receiving chambers 41 and 42. A space 5 which is of a shorter width than the shorter side of the bill is defined by a pair of ribs 51 and a pair of ribs 52 which are provided in front and rear sides of the bill passage 3. In the lower portion of the casing 1 is provided a reciprocating device 6 which reciprocates in the forward and rearward directions of the casing. A bill pushing member 7 which is of a smaller width than the space 5 is fixedly secured to the upper portion of the reciprocating device 6. By the reciprocating movement of the reciprocating device 6, the bill pushing member 7 is moved between points in about the middle of the bill receiving chambers 41 and 42 across the bill passage 3. In this bill pushing member 7 is provided a bill payout mechanism 8 for carrying a bill received in the bill receiving chamber 41 or 42 to the bill outlet $40_1$ or $40_2$.

The device will now be described more in detail. As the bill discrimination device X, a device disclosed in Japanese Preliminary Patent Application No. 77288/1985 filed by the applicant of this application, for example, may be employed.

The bill discrimination device X discriminates a true bill from a false one as well as the denomination of the bill and, responsive to a bill receiving signal produced upon carrying out of the vending operation by a vending machine or a money exchanger, carries the bill to the bill entrance 2 of the bill receiving device according to the present invention.

In the vicinity of the bill entrance 2, there is provided a switch SW1 which optically detects presence or absence of a bill. This switch SW1 continuously produces a detection signal while the bill delivered from the bill discrimination device X shields the light path of the switch.

The bill passage 3 is formed between a convey and drive means $30_1$ and bill holding means $30_2$. The convey and drive means $30_1$ consists of a pair of drive pulleys 31 driven by a motor MO1, a pair of driven pulleys 32 and a pair of conveyer belts 33 stretched between the drive pulleys 31 and the driven pulleys 32. The bill holding means $30_2$ consists of a pair of ribs 35 having rollers 34 provided in locations opposite to the conveyor belts 33 and being displaceable in the forward and rearward directions and a pair of solenoids SOL for displacing these ribs 35 in the forward and rearward directions. The bill passage 3 is constructed so that its length is larger than the longer side of the bill.

In response to turning on of the switch SW1, the motor MO1 is turned on and the solenoids SOL are excited to move the ribs 35 from the position shown by a solid line to the position shown by a two-dot chain line in FIG. 1, thereby conveying the inserted bill downwardly while holding it between the conveyer belts 33 and the rollers 34. Upon elapse of a predetermined period of time after the rear edge of the bill has passed through the switch SW1, the motor MO1 is turned off and feeding of the bill thereby is stopped. In this state, the bill is being held in the bill passage 3. The motor MO1 may be stopped by a switch SW5 to be described later which detects the leading edge of the bill.

The reciprocating device 6 consists of a rotating plate 61 which is rotated by a motor MO2 provided in the lower portion of the casing 1, a pin 62 which is secured to the upper surface of the rotating plate 61, and a slide portion 65 which has a slot 63 in which the pin 62 is engaged and moves forwardly and rearwardly along a rod 64 provided in the lower portion of the casing 1 and extending in the direction crossing the surfaces of the bill. The bill pushing member 7 is fixedly secured to the slide portion 65 and, by the rotation of the motor MO2, is caused to reciprocate between the position A shown in FIG. 1 and the position B shown by a two-dot chain line in FIG. 2 in accordance with instructions issued by a control circuit to be described later. Switches SW2 and SW3 are provided for detecting positions of the bill pushing member 7. The switch SW2 detects that the bill pushing member 7 is in a standby position A for stacking bills in the rear side bill receiving chamber 41 and the switch SW3 detects that the bill pushing member 7 is in a standby position B for stacking bills in the front side bill reeiving chamber 42.

In the bill pushing member 7 is provided the bill payout mechanism 8 which consists of a motor MO3, a reduction gear 81 and a roller 82 which is rotated by the motor MO3 via this reduction gear 81. The roller 82 has a contact surface 83 which consists of a material of a large coefficient of friction such as rubber and this contact surface 83 is projecting from the front and rear surfaces of the bill pushing member 7. The space 5 is defined by the pairs of ribs 51 and 52 which are provided on the front and rear sides of the bill passage 3 along the conveyer belts 33. The distance between the pair of ribs 51 or 52 is smaller than the shorter side of the bill.

Press plates 91 and 92 are provided for pushing bills received in the bill receiving chambers 41 and 42 inwardly by the force of springs 9. A bill support plate 10 is also provided at the bottom of the bill receiving chambers 41 and 42. Brush wheels 11 are provided above the bill entrance 2 and the bill outlets $40_1$ and $40_2$ for guiding in and out a bill.

In the standby mode, the bill pushing member 7 is in a standby state for receiving a first bill which is frequently used, e.g., a 1,000-yen bill (hereinafter referred to as a bill R) to be received in the bill receiving chamber 41, that is, the bill pushing member 7 is in the position A in the other bill receiving chamber 42. After the bill R has completely entered the bill passage 3, the bill pushing member 7 is moved in the direction of the bill receiving chamber 41 thereby pushing the bill R to the rear side of the ribs 51 and thereafter is caused to return to the position A and stop. On the other hand, when the bill discrimination device X has detected that a second bill which is less frequently used, e.g., a 10,000-yen bill or a 5,000-yen bill (hereinafter referred to as a bill L) has been inserted, the bill pushing member 7 is moved from the position A to the bill receiving chamber 41 and stopped at the standby position B where it enters the standby state for stacking the bill L. After the bill L has completely entered the bill passage 3, the bill pushing member 7 moves in the direction of the the bill receiving chamber 42 thereby pushing the bill L to the rear side of the ribs 52 in the bill receiving chamber 42 and thereafter stops at the standby position A.

In a case where the bill R in the first bill receiving chamber 41 is paid out, the bill pushing member 7 is moved to a bill payout position C (see a solid line 7 in FIG. 3) in which the rear surface of the bill pushing member 7 is positioned beneath the bill outlet $40_1$. In this state, one bill R which is in contact with the bill pushing member 7 is conveyed to the bill outlet $40_1$ by a counterclockwise rotation of the roller 82 of the bill payout mechanism 8.

Paying out of the bill L in the second bill receiving chamber 42 is performed by moving of the bill pushing member 7 to a bill payout position D (see a two-dot chain line 7 in FIG. 3) in which the front surface of the bill pushing member 7 is positioned beneath the bill outlet $40_2$ and clockwise rotation of the roller 82 of the bill payout mechanism 8.

The bill receiving standby positions A and B and the bill payout positions C and D of the bill pushing member 7 may be detected by a plurality of position detection switches which detect that the reciprocating device 6 has reached the respective positions A through D. Alternatively, the position detection may be performed by a single switch detecting a reference position of the reciprocating device 6 and a plurality of timers which are started by turning on or off of this switch.

The operation of the device shown in FIGS. 1 through 4 may be controlled by using a microcomputer in a manner described below with reference to flow charts of FIGS. 5 through 12.

The standby state of the bill receiving device according to the invention is a state in which the bill pushing member 7 is in the position A for stacking the bill R which is frequently used.

Upon insertion of a bill in the bill discrimination device X, whether the bill is a true bill or a false one as well as the denomination of the bill is examined in an optical-mangetic method (step 100). If the bill is judged to be a false one, the feed mechanism of the bill discrimination device X is reversely driven and the bill thereby is returned to the insertion slit.

When the bill discrimination device X has judged that the bill is a true one, the bill stacking operation is not immediately started. The bill is temporarily retained in the bill discrimination device X in a returnable state until a signal indicating that vending or money exchange has been carried out in the vending machine or the money exchanger (hereinafter referred to as a vend start signal) is provided.

When the vend start signal has been produced in the temporary retention state, a bill receiving signal is produced and, in respose to this bill receiving signal, the bill stacking operation is now started.

[In the case of bill R]

If the inserted bill is a bill R, the processing proceeds from step 101 to step 102 in which the operation is suspended until the bill receiving signal is provided. If a bill return signal is produced during this waiting time, the bill return process is carried out and the processing returns to the standby state (steps 103 and 104).

Upon receipt of the bill receiving signal, the bill R is fed to the bill entrance 2 by the feeding mechanism of the bill discrimination device X. Upon detecting the bill which has entered the bill entrance 2 by the switch SW1 which is provided immediately before the bill entrance 2 (YES in step 105), a timer T0 is started and the solenoids SOL are actuated and the motor MO1 is started (steps 106 and 107). The bill is thereby fed downwardly along the bill passage 3. When the rear edge of the bill has come out of the switch SW1, a timer T1 is started (steps 108 and 109). If the rear edge of the bill has not come out of the switch SW1 by the end of the set time of the timer T0, it is assumed that a trouble has occurred and the operation proceeds to "SET STOP" (step 110). The set time of the timer T0 is a period of time which is normally required for one stack cycle of the bill. The timer T0 is provided for watching whether the stacking operation will be completed within this time or not. The set time of the timer T1 is a period of time required for the bill to reach a predetermined position in the bill passage 3 opposite to the bill pushing member 7.

In step 11, whether or not the set time of the timer T1 has elapsed is examined. During the operation time of the timer T1, whether or not the bill has been detected by the switch SW5 provided at the lower end of the bill passage 3 is examined in step 112. The operation proceeds to step 113 depending either upon elapse of the set time of the timer T1 or upon detection of the bill by the switch SW5 in which step the motor MO1 and the solenoids SOL are turned off. The bill thereby stops at the predetermined position in the bill passage 3 opposite to the bill pushing member 7 in which position the bill is released from the state in which it is clamped between the belts 33 and the rollers 34. Alternatively, the turning off of the motor MO1 and the solenoids SOL may be controlled by only one of the conditions of the timer T1 and the switch SW5.

Nextly, turning off of the solenoids SOL is confirmed (step 114) and the motor MO2 is turned on (step 115). The bill pushing member 7 thereby is moved from the standby position A to the right as viewed in FIG. 1, pushing the bill located in the bill passage 3 to stack it in the bill receiving chamber 41 on the rear side of the bill passage 3. Thereafter, by continuation of rotation of the motor MO2, the bill pushing member 7 is moved to the left in FIG. 1 to return to the position A and stop. This stacking operation for one cycle is controlled by output signals of the switches SW2 and SW3. After starting of the motor MO2, whether or not the switch SW2 has been turned on, the switch SW3 has been turned on, the switch SW3 has been turned off and the switch SW2 has been turned off in order (i.e., whether or not the bill pushing member 7 has left the position A corresponding to the switch SW2, arrived at the position B corresponding to the switch SW3 , then left the position B and finally arrived at the position A) is examined in steps 116 through 119. If all of these conditions have been satisfied, the motor MO2 is stopped and the timer T0 is reset to finish the stacking operation (steps 120 and 121). If the stacking operation is not completed within the set time of the timer T0, it is assumed that a trouble has occurred and the operation proceeds to "SET STOP" (step 122).

[In the case of bill L]

Figure 5:
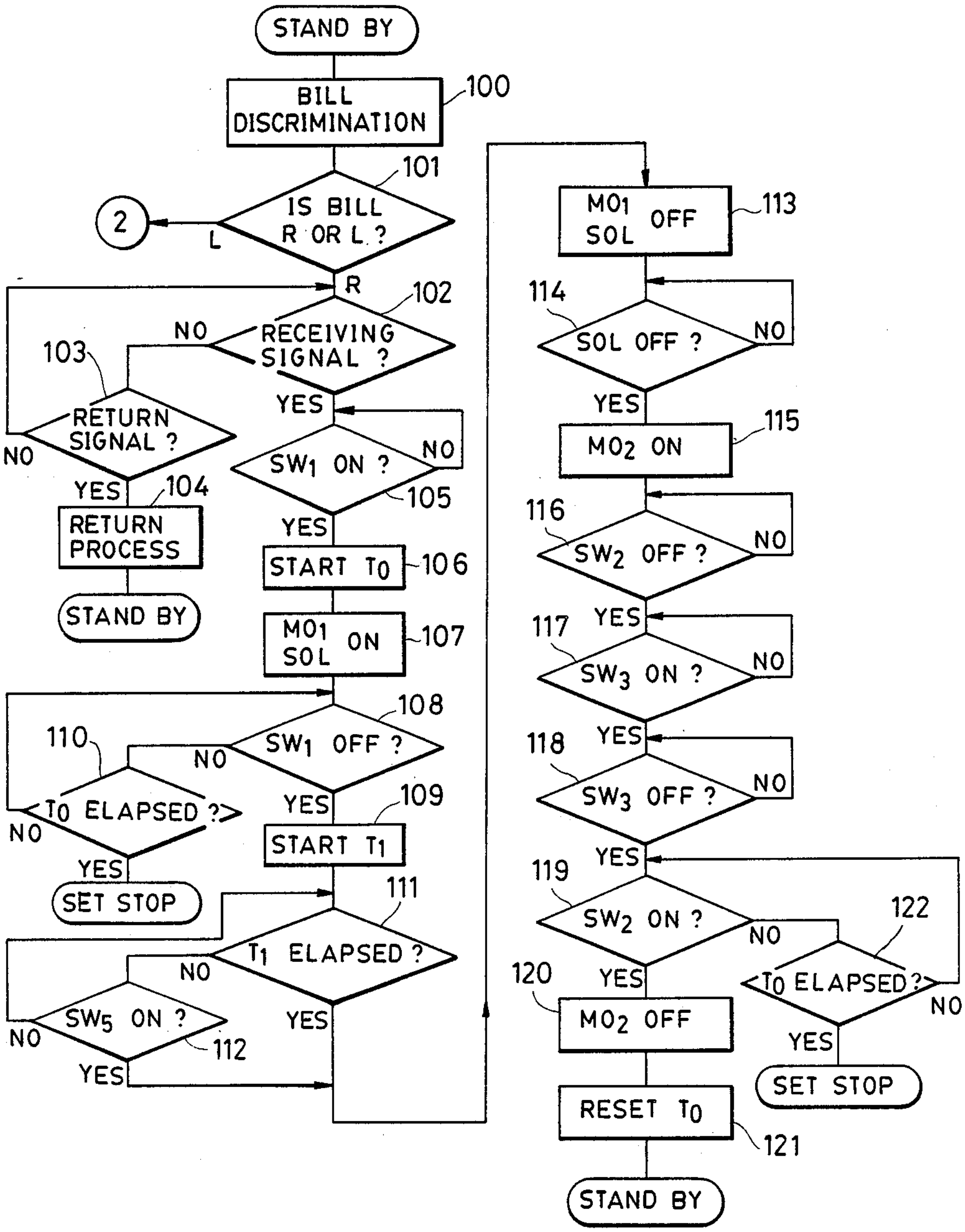
FIGS. 5 and 6 are flow charts showing an example of a program for controlling a bill receiving operation in this embodiment.
Figure 6:
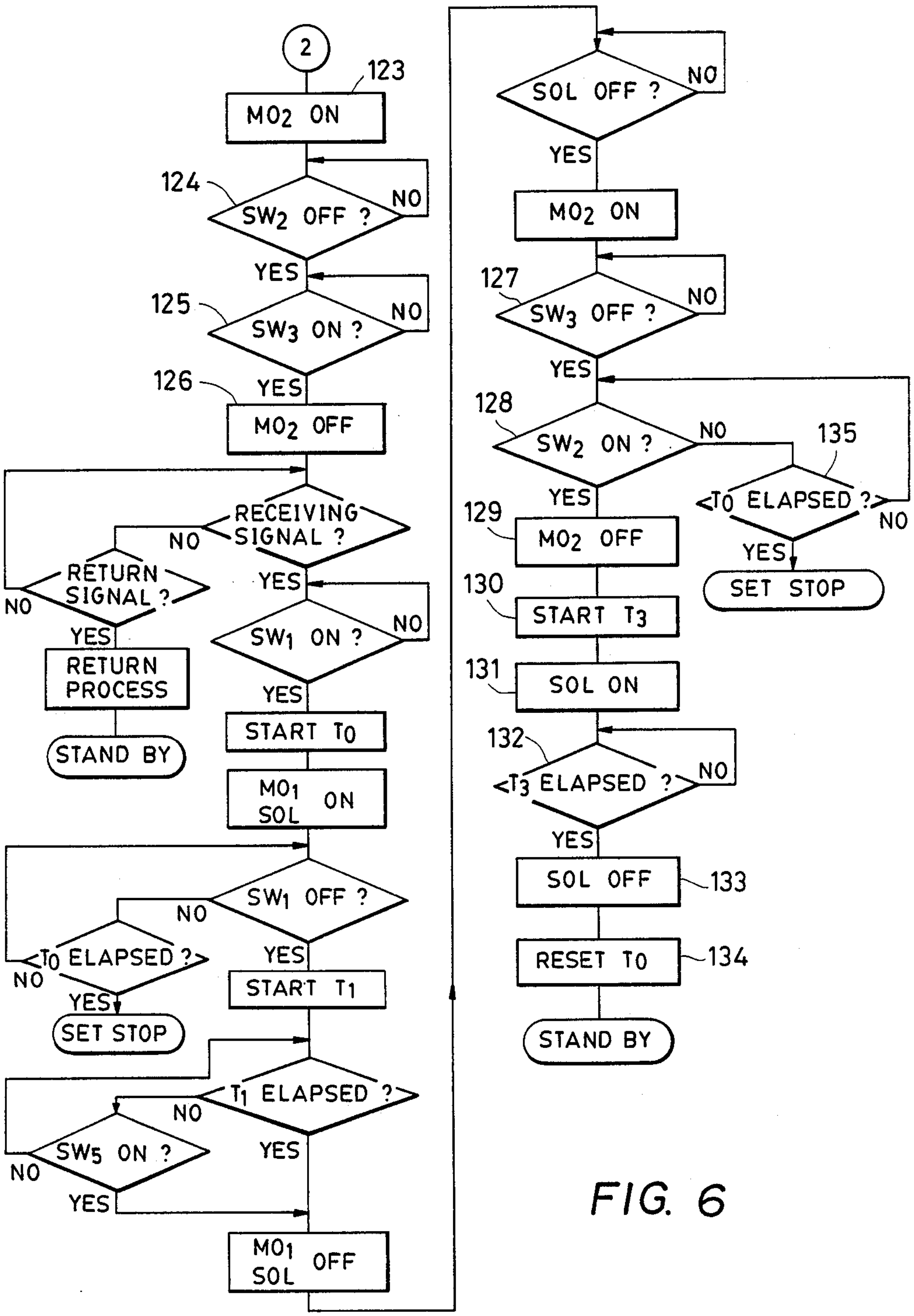

If the inserted bill is a bill L, the operation proceeds from step 101 to step 123 in FIG. 6 in which the motor MO2 of the reciprocating device 6 is rotated. The bill pushing member 7 is moved from the standby position A in FIG. 1 to the right as viewed in the figure. Upon confirming that the switch SW2 has been turned off and the switch SW3 has been turned on, the motor MO2 is stopped (steps 124 through 126). Thus, the bill pushing member 7 is set at the standby position B shown by the two-dot chain line in FIG. 2. Nextly, processings similar to those of steps 102 through 113 in FIG. 5 are performed. That is, upon receipt of the bill receiving signal, the bill is fed into the bill passage 3 and, when the bill has been conveyed to the predetermined position in the bill passage 3 opposite to the bill pushing member 7, conveying of the bill is stopped and the bill is released from a state in which it is clamped between the belts 33 and the rollers 34. Further, processings similar to those of steps 114 and 115 in FIG. 5 are performed whereby the reciprocating device 6 is driven by rotation of the motor MO2. The bill pushing member 7 thereby is moved from the standby position B in FIG. 2 to the left as viewed in the figure, pushing the bill in the bill passage 3 and stacking it in the bill receiving chamber 42 on the front side of the bill passage 3. Upon confirming that the switch SW3 has been turned off and the switch SW2 has been turned on, the motor MO2 is stopped (steps 127 through 129). In subsequent steps 130 through 133, the solenoids SOL are actuated during the operation time of the timer T3. Lastly, the timer T0 is reset and the stacking operation is completed (step 134). If the stacking operation has not been completed within the set time of the timer T0, it is assumed that a trouble has occurred and the operation proceeds to "SET STOP" (step 135) in the same manner as was previously described.

[Payout of bill R]

Figure 7:
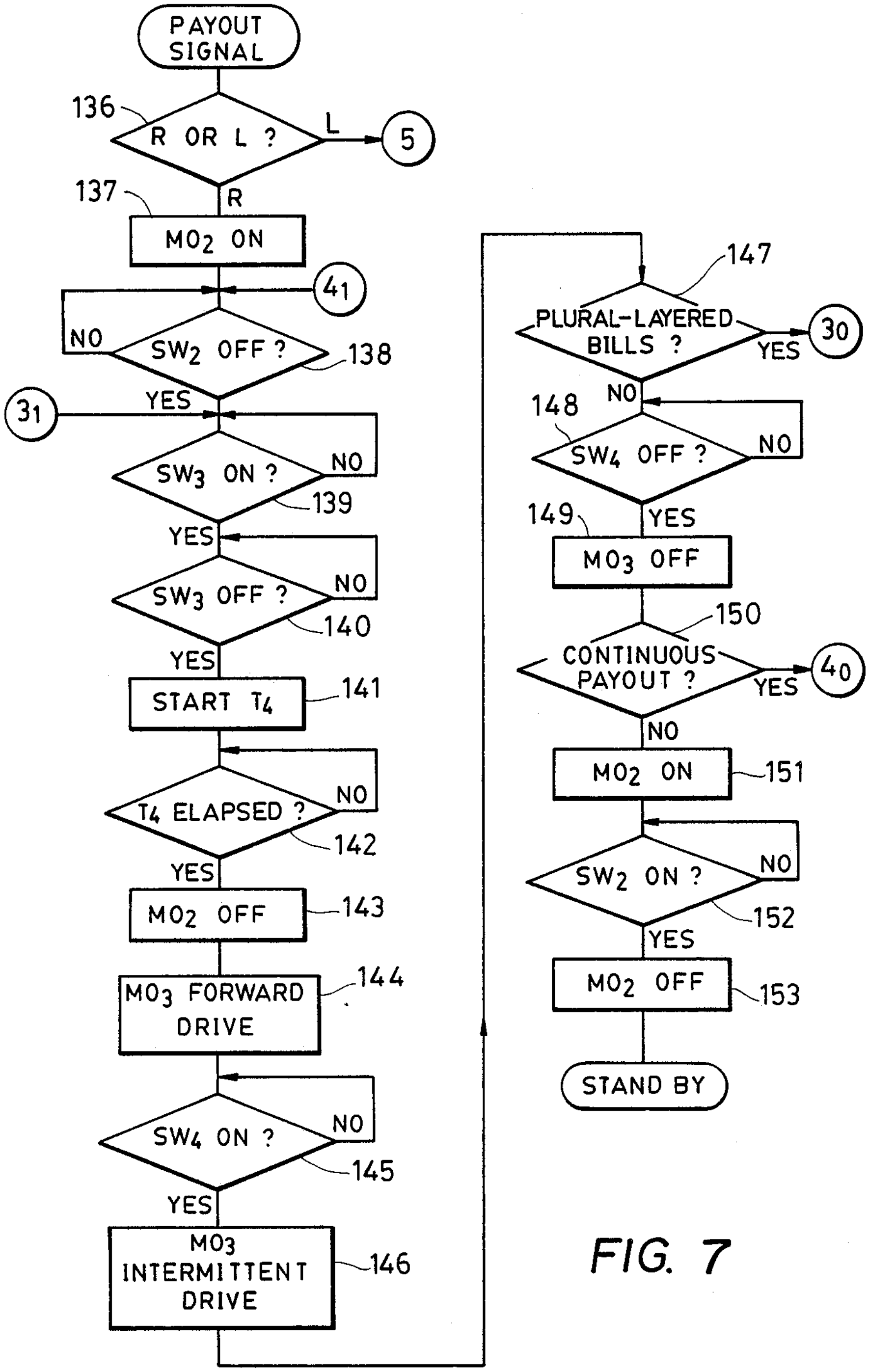
FIGS. 7 throgh 9 are flow charts showing an example of a program for controlling an operation for paying out a bill from one of the bill receiving chambers in the same embodiment.

When a payout signal ordering payout of a bill R or L received in the bill receiving chamber 41 or 42 is provided by a control device of either the vending machine or the money exchanger, an operation shown in FIG. 7 is performed.

First, the step 136, which of the bills R and L is to be paid out according to the order of the payout signal is examined and, if it is the bill R, the operation proceeds to step 137 in which the motor MO2 is driven. After executing subsequent steps 138 through 142, the motor MO2 is stopped. The bill pushing member 7 thereby is moved from the position A in FIG. 2 to the right as viewed in the figure and reaches the position B pushing the bill R in the bill receiving chamber 41. Then, by continuation of rotation of the motor MO2, the bill pushing member 7 is moved back to the left as viewed in the figure and stops at the position C in FIG. 3. This operation is controlled in accordance with output signals of the switches SW2, SW3 and the timer T4. That is, after the motor MO2 is started, the facts that the switch SW2 has been turned off, the switch SW3 has been turned on and the switch SW3 has been turned off (i.e., the bill pushing member 7 has left the position A corresponding to the switch SW2, reached the position B corresponding to the switch SW3 and then left the position B) are confirmed in steps 138 through 140 and upon elapse of the set time of the timer T4 which starts when the switch SW3 has been turned off, the motor MO2 is stopped. The operation time of the timer T4 is set at time required for moving of the bill pushing member 7 from the position B to the position C.

In a state in which the bill pushing member 7 is at the position C, the motor MO3 of the bill payout mechanism 8 is forwardly rotated (rotation of the motor MO3 imparting a counterclockwise rotation to the roller 82 as viewed in the figure is herein called forward rotation and rotation of the motor MO3 imparting a clockwise rotation to the roller 82 is herein called reverse rotation) and the roller 8 is rotated counterclockwise whereby the leftmost bill among the stack of bills R in the bill receiving chamber 41 which is in contact with the contact surface 83 of the roller 82 is fed upwardly (step 144). The upwardly conveyed bill passes the outlet $40_1$ and the brush wheels 11 and enters the bill discriminating device X.

A plural-layered bills detection switch SW4 consisting of a switch detecting the amount of transmitting light is provided for detecting whether or not two or more bills one lying on top of another are fed upwardly (in the present embodiment, no special switch SW4 is provided but the switch SW1 is concurrently used for this switch SW4). When the leading edge of the upwardly fed bill or bills has reached the position of the plural layered bills detection switch SW4, step 145 becomes YES and the operation proceeds to step 146 in which the motor MO3 is intermittently driven. This intermmittent drive of the motor MO3 is performed for causing an extra bill (or bills) which is not in contact with the contact surface 83 of the roller 82 to fall in a case where two or more bills are fed upwardly in a state in which one lies on top of another. While this intermittent drive is performed, the output of the switch SW4 is analyzed to enable judgement as to whether one bill or two or more bills in layer are being paid out. This judgement is made by a known device such as a light amount level discriminator which measures the level of transmitting light detected by the switch SW4.

If it has been judged that there are no plural layered bills, the operation proceeds from NO of step 147 to steps 148 and 149 in which the motor MO3 is rotated until the switch SW4 is turned off by passing of the rear edge of the bill through the switch SW4 and the motor MO3 is stopped upon turning off of the switch SW4. Although not shown in the figure, the bill feeding mechanism of the bill discrimination device X starts its reverse drive in response to the payout signal and the turning on of the switch SW4 for conveying the bill fed back from the bill receiving device further to the bill insertion slit.

Thus, only a single bill is payed out. In step 150 in FIG. 7, whether the payout signal is continuously provided or not is examined. If result is NO, the motor MO2 is rotated to move the bill pushing member 7 from the position C in FIG. 3 to the left as viewed in the figure (step 151). Upon reaching of the bill pushing member 7 to the standby position A, the switch SW2 is turned on (step 152) and the motor MO2 thereby is stopped (step 153).

Figure 3:
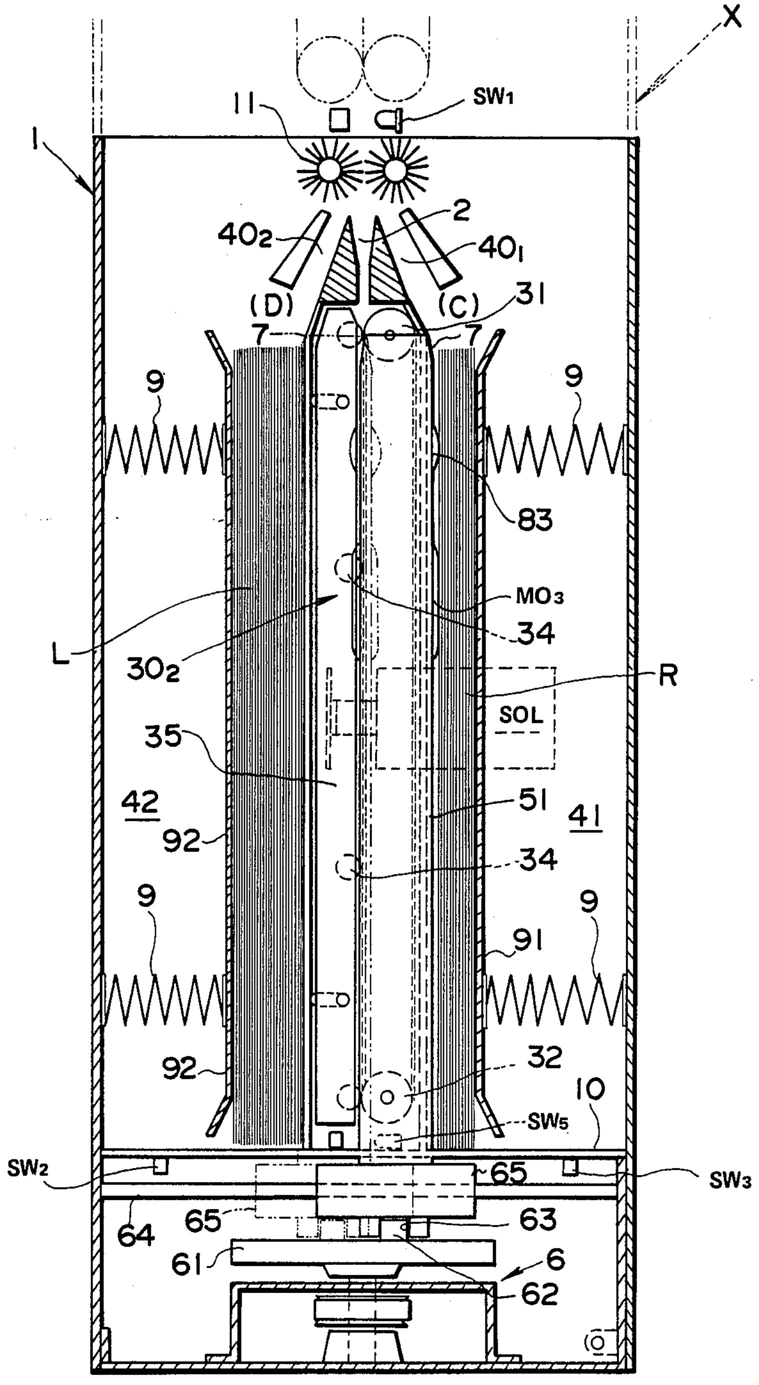
FIG. 3 is a sectional side view showing a state in which a bill is being paid out in the same embodiment.
Figure 4:
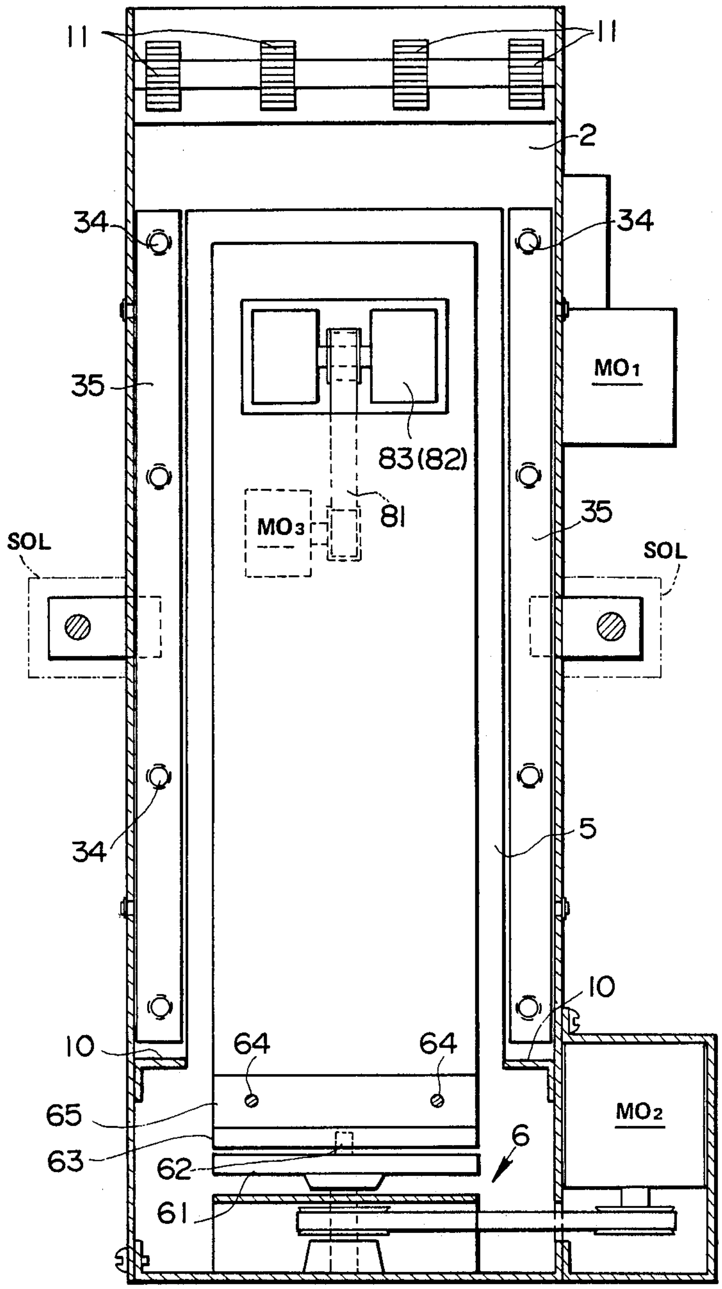
FIG. 4 is a sectional view taken along lines IV—IV in FIG. 1.
Figure 9:
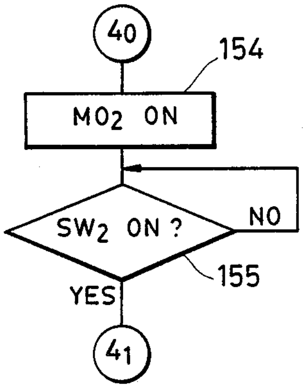

In a case where payout of bills is continuously performed, the operation proceeds from YES of step 150 to steps 154 and 155 in FIG. 9 in which the motor MO2 is rotated to move the bill pushing member 7 from the position C in FIG. 3 to the left as viewed in the figure and reaching of the bill pushing member 7 to the standby position A is confirmed by turning on of the switch SW2. Then, the operation returns to step 138 in FIG. 7 and the above described bill payout processings are repeated. In this repeated bill payout operation, the bill pushing member 7 is reciprocated each time one bill is paid out. This reciprocating movement is performed for preventing payout of bills in a plural layered state which tends to occur if payout of bills is repeatedly made in a state in which the bill pushing member 7 keeps on pushing bills in the position C in FIG. 3.

[Payout of bill L]

Figure 10:
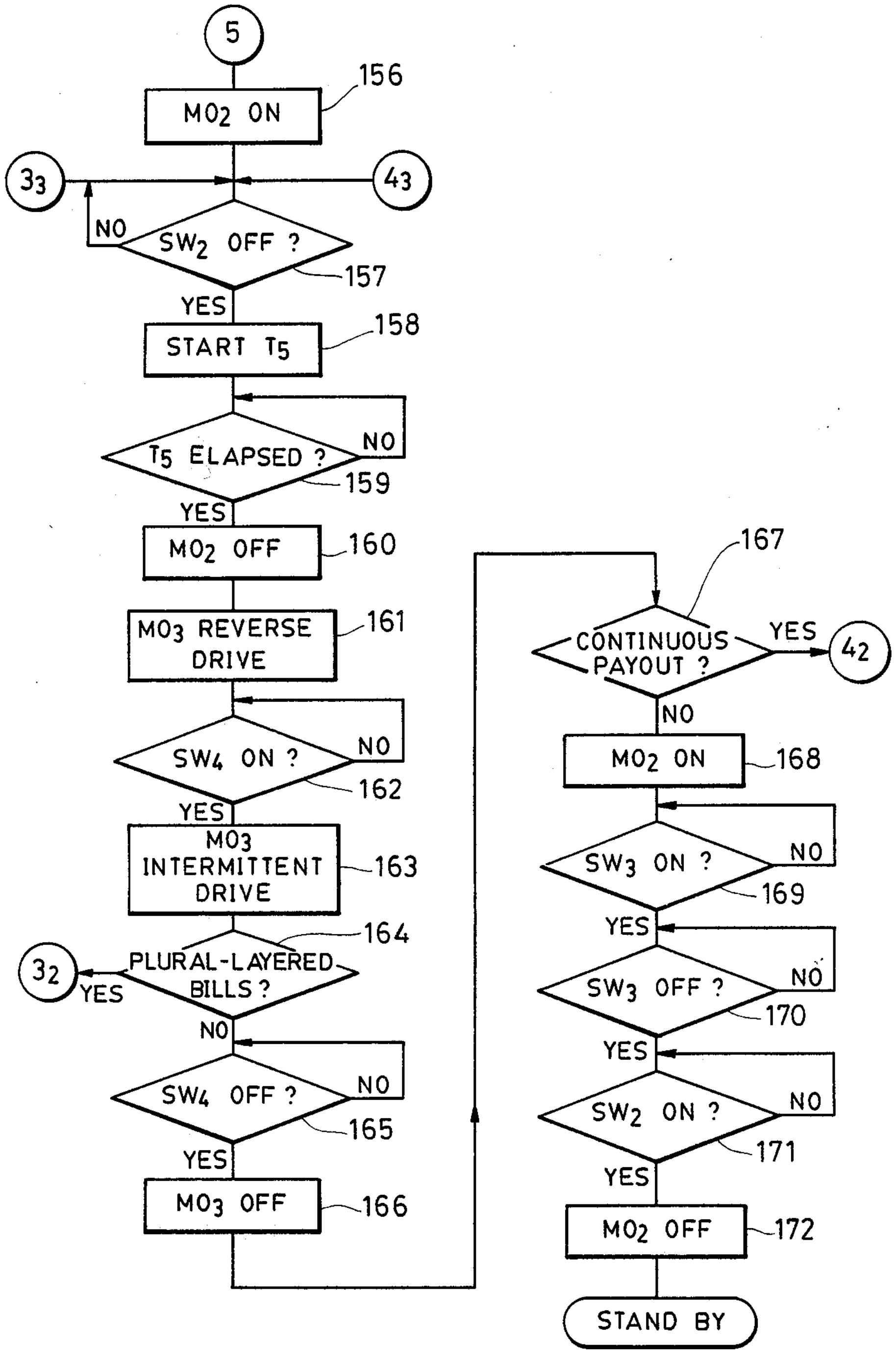
FIGS. 10 through 12 are flow charts showing an example of a program for controlling an operation for paying out a bill from the other bill receiving chamber in the same embodiment.

When a payout signal ordering payout of a bill L in the bill receiving chamber 42 is provided by the vending machine or money exchanger, the operation proceeds from step 136 in FIG. 7 to step 156 in FIG. 10 in which the motor MO2 is driven. After executing subsequent steps 157 through 160, the motor MO2 is stopped. The bill pushing member 7 thereby is moved from the position A to the right as viewed in the figure and stopped at the position D in FIG. 3. That is, after starting rotation of the motor MO2, the switch SW2 is turned off and upon elapse of the set time of the timer T5 which starts when this switch SW2 is turned off, the motor MO2 is stopped. The operation time of the timer T5 is set to time required for moving of the bill pushing member 7 from the position A to the position D.

In a state in which the bill pushing member 7 is at the position D, the motor MO3 of the bill payout mechanism 8 is reversely rotated and the roller 82 thereby is rotated clockwise whereby the rightmost bill among the stack of bills L in the bill receiving chamber 42 which is in contact with the contact surface 83 of the roller 82 is fed upwardly (step 161). The upwardly conveyed bill passes through the payout slit $40_2$ and the brush wheels 11 and enters the bill discrimination device X. The following steps 162 through 167 are the same as steps 145 through 150 in FIG. 7 and the bill is paid out in such a manner that plural layered bills are not paid out.

Steps 168 through 171 in which repeated payout is not made are the same as steps 137 through 140 in FIG. 7 and the bill pushing member 7 is once moved to the position B and then moved back to the standby position A. Then, the motor MO2 is stopped (step 172).

Figure 12:
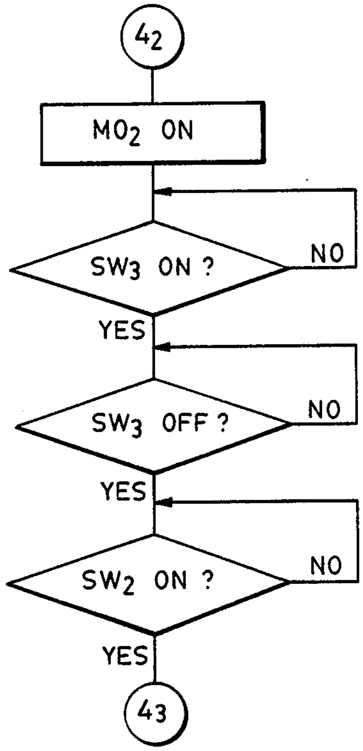
Figure 13:
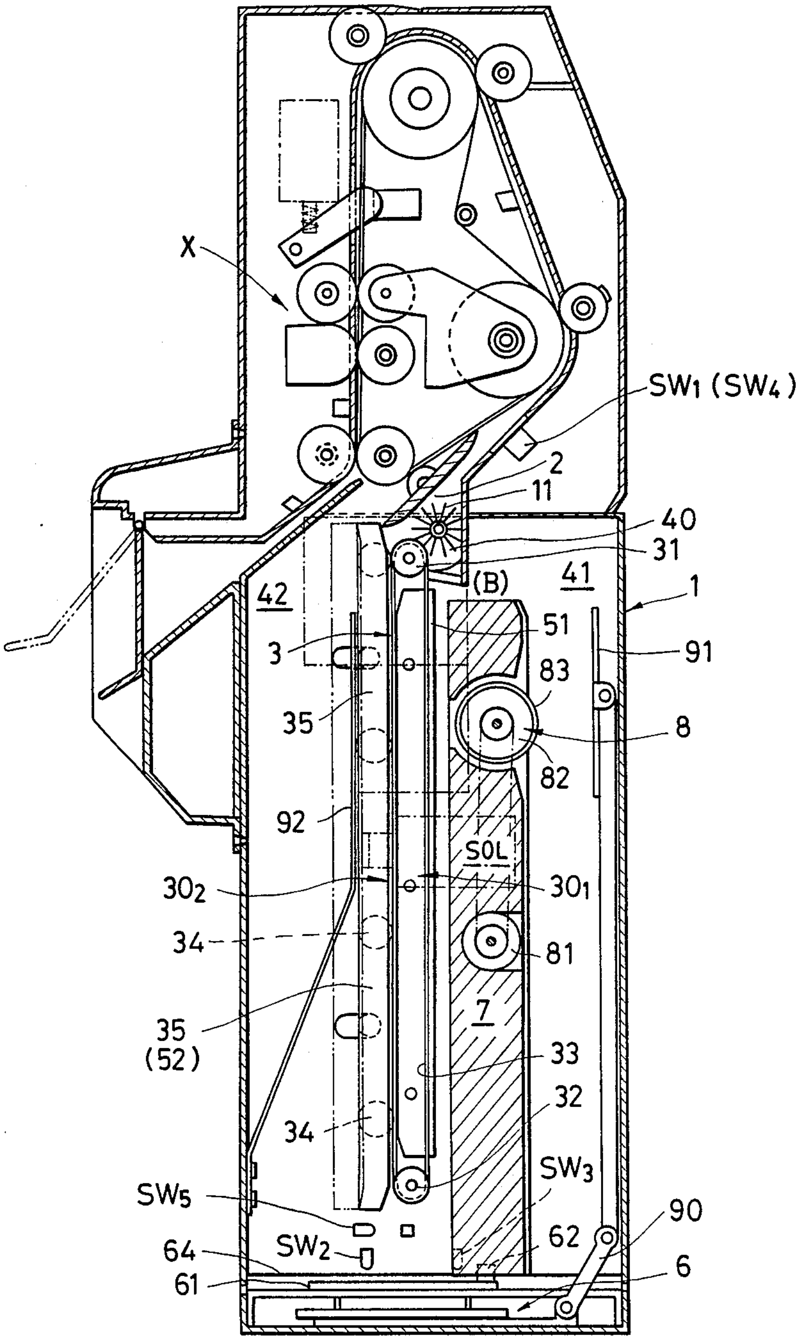
FIG. 13 is a sectional side view showing another embodiment of the bill receiving device of the invention.

When payout of bills is performed repeatedly, the operation proceeds from YES in step 167 to processings in FIG. 12. The processings in FIG. 12 are the same as steps 168 through 171 in FIG. 10 and the bill pushing member 7 is once moved to the position B and then is moved back to the standby position A. Then, the operation returns to step 157 in FIG. 10 and the bill payout operation which is the same as the above described one is repeated.

[In case plural layered bills have been detected]

Figure 8:
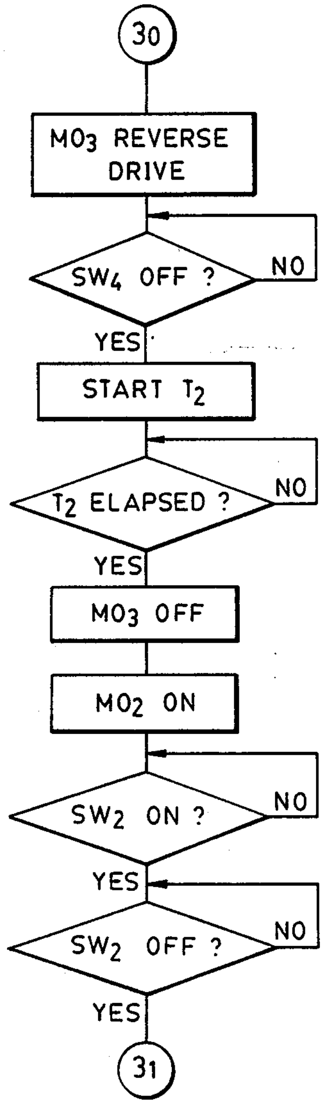

If plural layered bills have been detected during paying out of the bill R, the operation proceeds from YES in step 147 to processings in FIG. 8. The motor MO3 is reversely rotated to return the bill to the bill receiving chamber 41. When the rear edge of the bill has passed through the switch SW4, the timer T2 is started and, upon elapse of the set time of the timer T2 , the motor MO3 is stopped. The operation time of the timer T3 is time required for returning the bill to the bill receiving chamber 41. Then, the motor MO2 is rotated to move the bill pushing member 7 from the position C in FIG. 3 to the left as viewed in the figure. Reaching of the bill pushing member 7 to the standby position A is confirmed by turning on of the switch SW2 and, further, moving of the bill pushing member 7 from the standby position A to the right as viewed in the figure is confirmed by turning off of the switch SW2. Then, the operation returns to step 139 in FIG. 7 and the bill payout operation which is the same as the above described one is repeated.

Figure 11:
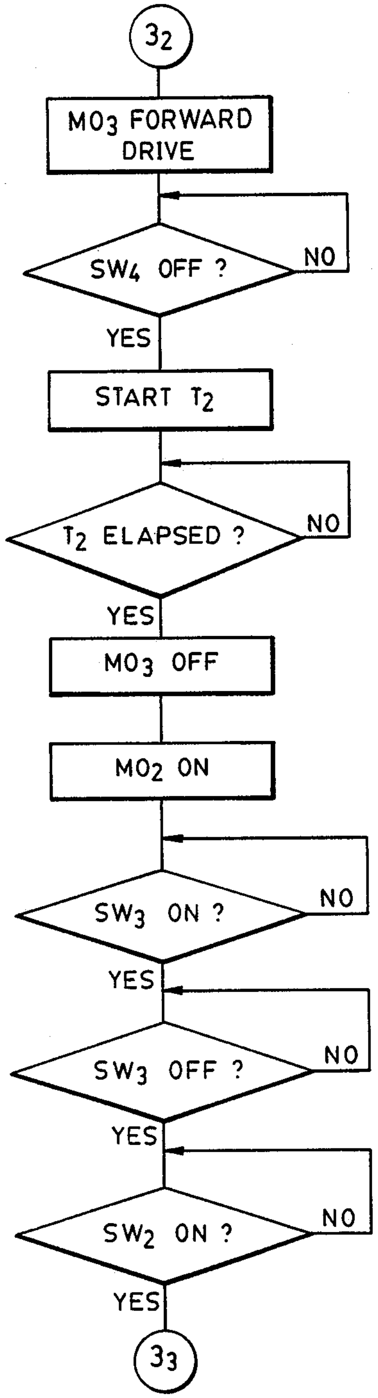

If plural layered bills have been detected during payout of a bill L, the operation proceeds from YES of step 164 in FIG. 10 to the processings in FIG. 11. The motor MO3 is forwardly rotated to return the bill to the bill receiving chamber 42. When the rear edge of the bill has passed through the switch SW4, the timer T2 is started and, upon elapse of the set time of the timer T2, the motor MO3 is stopped. Then, the motor MO2 is rotated to move the bill pushing member 7 from the position D in FIG. 3 to the right as viewed in the figure. Reaching of the bill pushing member 7 to the position B is confirmed by turning on of the switch SW3 and, moving of the bill pushing member 7 further from the position B to the left as viewed in the figure is confirmed by turning off of the switch SW3 and reaching of the bill pushing member 7 to the position A is confirmed by turning on of the switch SW2. Then, the operation returns to step 157 in FIG. 10 and the bill payout operation which is the same as the above described one is repeated.

In the illustrated example, the above described routine is repeated as many times as plural layered bills have ceased to be detected. Alternatively, the number of repetition may be fixed so that in the event that occurrence of plural layered bills has not ceased notwithstanding repetition of the routine by the fixed number of times, it is assumed that the device is out of order.

Another embodiment of the invention is shown in FIGS. 13 through 16. This embodiment is somewhat different in construction from the one shown in FIGS. 1 through 4. In FIGS. 13 through 16, the devices and members performing the same functions as that shown in FIGS. 1 through 4 are designated by the same reference characters. Accordingly, description of the devices and members performing the same functions designated by the same reference characters is not repeated. In this embodiment, only a bill R received in the bill receiving chamber 41 on the left side as viewed in the figure can be paid out and a bill L received in the bill receiving chamber 42 on the left side cannot be paid out. In this embodiment, not only bills as currency but also prepaid credit vouchers can be handled.

In the embodiment of FIGS. 13 through 16, a bill discrimination device which can discriminate a true bill or credit voucher from a false one as disclosed in Japanese Preliminary Patent Publication Nos. 220485/1985 and 101890/1986 is used as the bill discrimination device X. The right side bill receiving chamber 41 from which a bill can be paid out receives a bill which is expected to be used as a change, e.g., a 1,000-yen bill (this bill is assumed to be a bill R). The left side bill receiving chamber 42 from which a bill cannot be paid out receives bills which are not expected to be used as a change, e.g., a 10,000-yen bill, a 5,000-yen bill and a prepaid credit voucher (these are assumed to be bills L).

In the embodiment shown in FIGS. 13 through 16, a press plate 92 which is provided for pusing a bill or a credit voucher (hereinafter referred to simply as a bill) received in the bill receiving chamber 42 inwardly consists of a leaf spring. A press plate 91 which is provided for pushing a bill received in the bill receiving chamber 41 inwardly is interlocked with the reciprocating device 6 through a link mechanism 93 and functions to support a stack of bills in the chamber 41 from the back side of the stack against the pressure excerted by the roller 82 of the bill payout mechanism 8 when a bill is paid out. The ribs 52 on the side of the bill receiving chamber 42 are omitted and the ribs 35 for holding the bill concurrently perform the function of the ribs 52.

Figure 14:
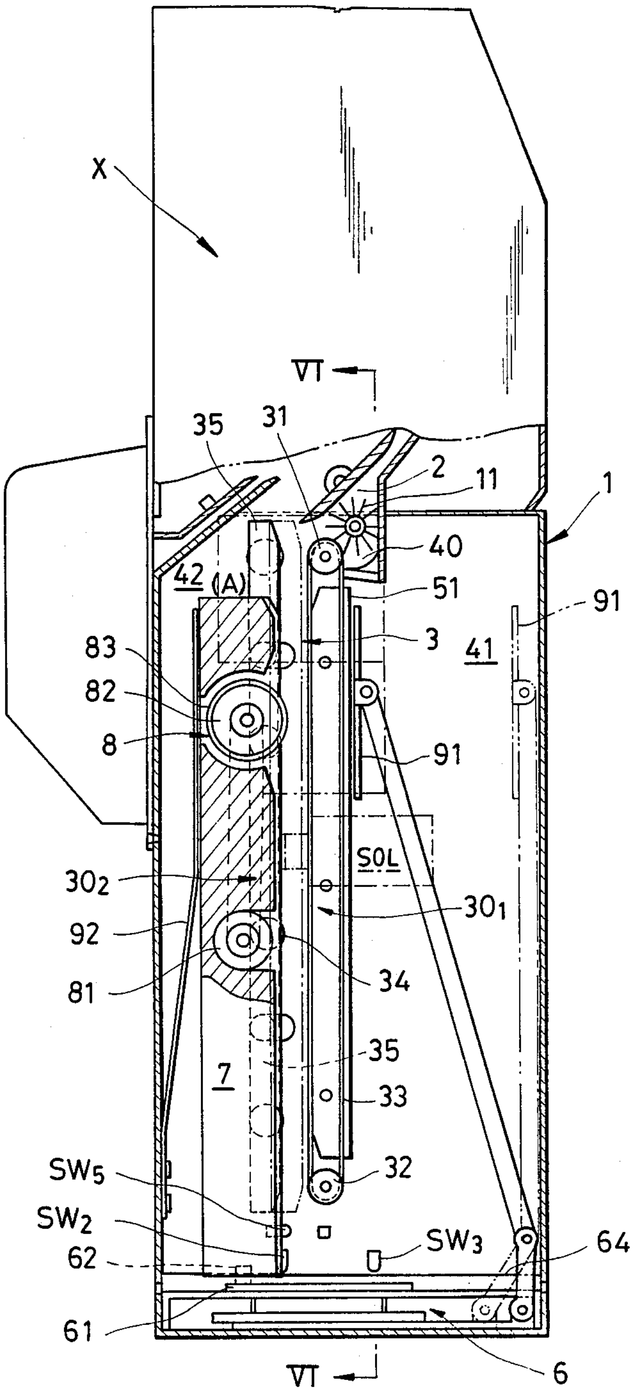
FIG. 14 is a sectional side view showing a state in which the stroke position of the bill pushing member is changed in the same embodiment.

FIG. 14 shows a state in which the bill pushing member 7 is in the standby position A. In this state, the bill pushing member 7 is positioned in the leff side bill receiving chamber 42 and holds a bill L with the press plate 92 whereas a bill R in the right side bill receiving chamber 41 is held between the ribs 51 and the press plate 91. When the bill R is received, entirely the same operation as the one desribed with reference to FIG. 5 is performed. More specifically, the solinoid SOL is actuated to displace the ribs 35 from the position shown by a solid line to the position shown by a two-dot chain line and a bill is conveyed along the bill passage 3. Upon conveying the bill to a predetermined position, the solenoids SOL are deenergized to return the ribs 35 from the position shown by the two-dot chain line to the position shown by the solid line thereby releasing the bill. Then, in the same manner as was previously described, the bill pushing member 7 performs one reciprocating motion to receive the bill R in the bill receiving chamber 41.

Figure 17:
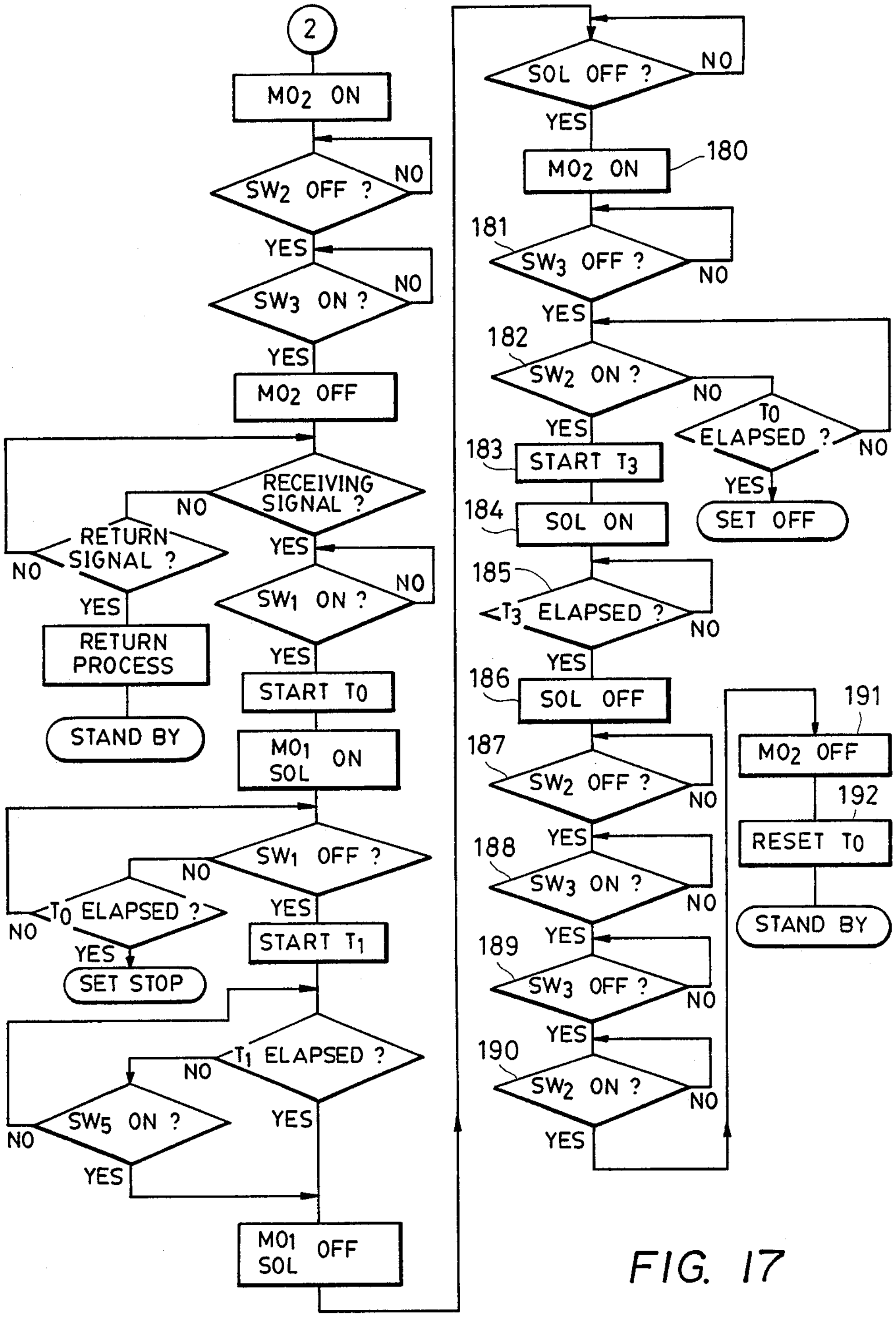
FIG. 17 is a flow chart showing an example of a program for controlling an operation receiving a bill in one of the bill receiving chambers in the same embodiment.

When the bill L is received, an operation shown in FIG. 17 which is substantially the same as the one described with reference to FIG. 6 is performed. More specifically, the bill pushing member 7 is moved from the standby position A to the position B in FIG. 13 and thereafter the bill L is conveyed to a predetermined position in the bill passage 3. The bill stacking operation executed by processings of steps 180 through 192 is somewhat different from that shown in FIG. 6. In the present embodiment, the reciprocating device 6 is driven by driving the motor MO2 (step 180). The bill pushing member 7 thereby is moved from the position B in FIG. 13 to the left as viewed in the figure to push the bill in the bill passage 3 and cause it to be stacked in the left side bill receiving chamber 42. Upon confirming turning off of the switch SW3 and turning on of the switch SW2 due to the movement of the bill pushing member 7, the solenoids SOL are energized during the operation time of the timer T3 (steps 181 through 186). The motor MO2 is continuously driven during this time. Upon confirming turning off of the switch SW2, turning on of the switch SW3, turning off of the switch SW3 and turning on again of the switch SW2 due to further movement of the bill pushing member 7, the motor MO2 is stopped (steps 187 through 191). Lastly, the timer T0 is reset and the stacking operation is thus completed (step 192). The energizing and deenergizing of the solenoids SOL are made to ensure stacking of bills L, for the bills L include such a thick bill as a credit voucher.

Figure 15:
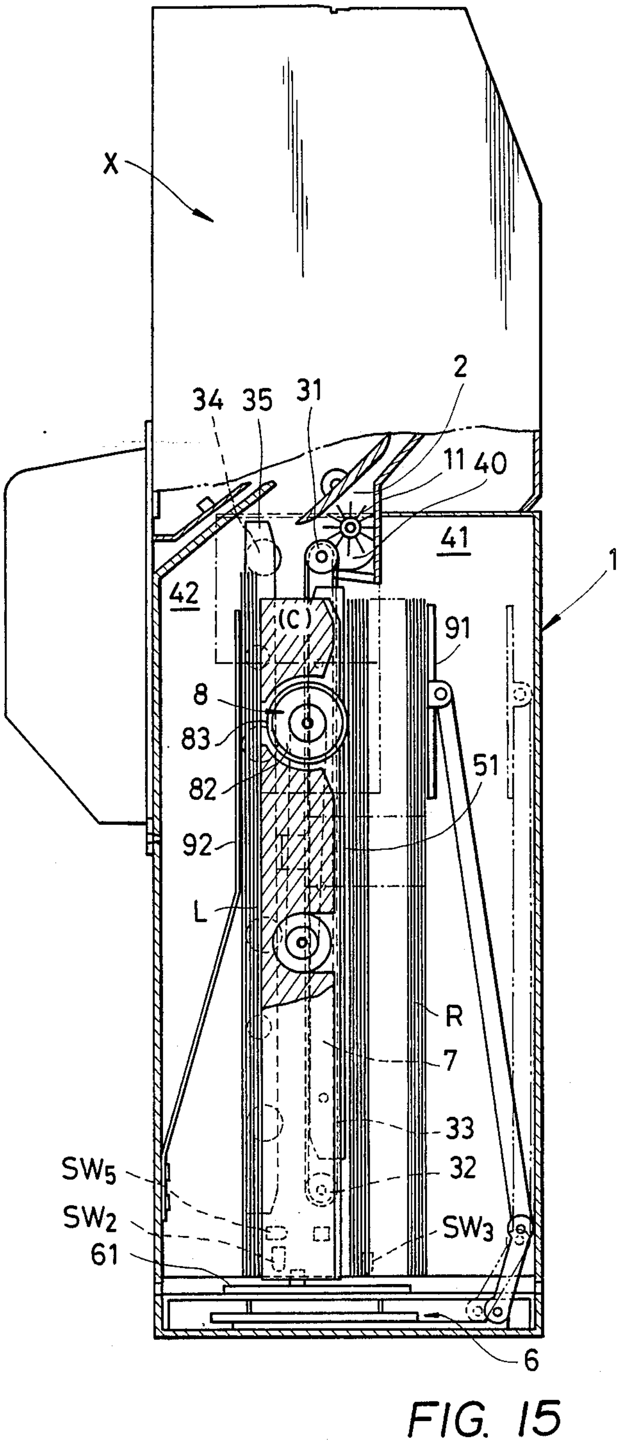
FIG. 15 is a sectional side view showing a state in which a bill is paid out in the same embodiment.
Figure 16:
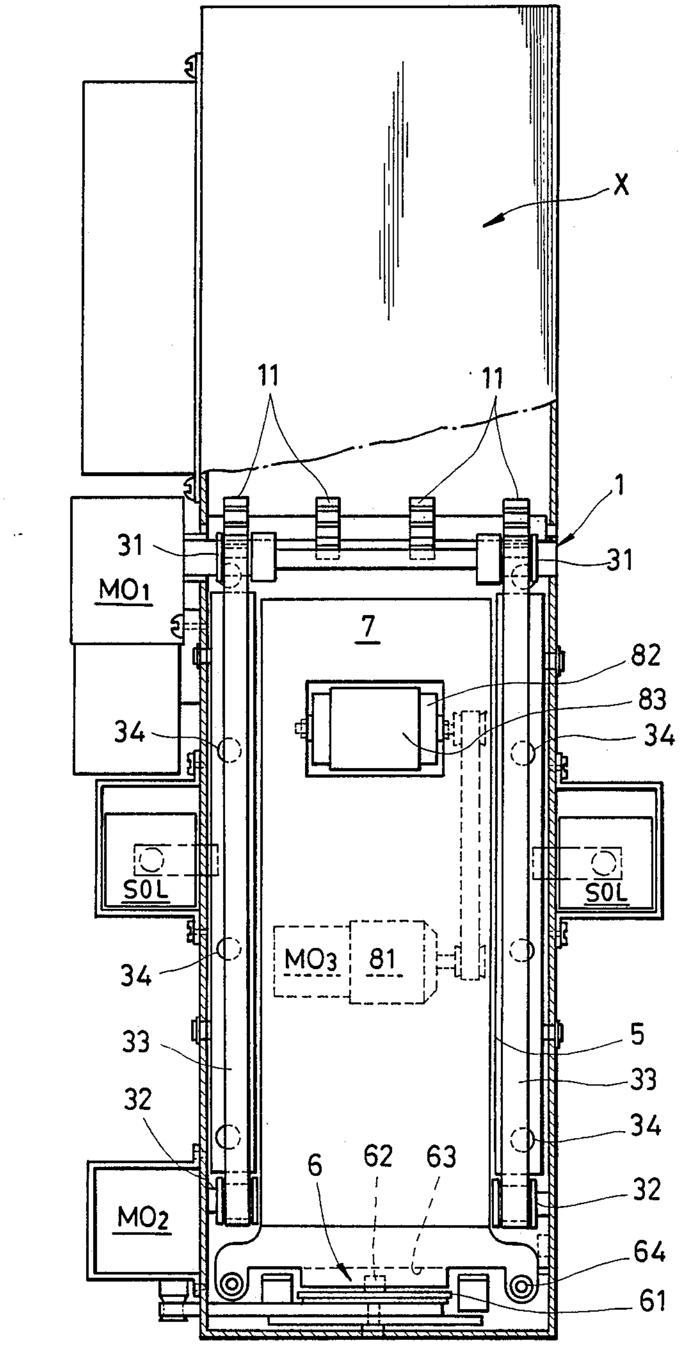
FIG. 16 is a sectional view taken along lines VI—VI in FIG. 14.

FIG. 15 shows a state in which the bill pushing member 7 is in the payout position C. In this state, the roller 82 of the bill payout mechanism 8 provided in the bill pushing member 7 is in contact with the leftmost bill in the stack of bills R in the right side bill receiving chamber 41. The edge of this leffmost bill is located beneath the bill outlet 40. When the bill R is paid out, an operation which is substantially the same as the one described with reference to FIGS. 7 through 9 is performed. Only difference is that the judgement in step 137 in FIG. 7 is unnecessary in the present embodiment.

As described in the foregoing, according to the invention, a small-sized and compact bill receiving device with abundant functions can be provided by dividing the casing of the bill receiving device into the front and rear bill receiving chambers, receiving bills in these chambers after sorting them into two kinds of bills and enabling payout of bills once received in these chambers. Further, by receiving bills of a common denomination in each of these bill receiving chambers when bills of two different denominations are used and enabling payout of bills from both of these chambers, a bill receiving device in which the bills of the two different denominations can be both used as a change can be constructed with a compact construction. Furthermore, when bills (and credit vouchers or the like) of two or more different denominatins are used, by receiving one denomination of bills to be used as a change in one of these bill receiving chambers thereby enabling payout of these bills and receiving bills (and credit vouchers of the like) of other denominations in the other bill receiving chamber, many denominations of bills (and credit vouchers or the like) can be received while securing one denomination of bills as a change.

What is claimed is:

1. A bill receiving device comprising:

a bill passage;

conveying means for conveying a bill delivered to said bill passage to a predetermined position for receiving it;

first and second bill receiving chambers formed on both sides of said bill passage, at least said first bill receiving chamber having a bill outlet;

a bill pushing member being capable of moving in a reciprocating motion between said first and second bill receiving chambers across and bill passage and, when the bill located at the predetermined position in said bill passage is to be received in said first bill receiving chamber, effects receiving of the bill by pushing it with a first surface of said bill pushing member while moving from said second bill receiving chamber towards said first bill receiving chamber and, when the bill is to be received in said second bill receiving chamber, effects receiving of the bill by pushing it with a second surface of said bill pushing member with is opposite to said first surface while moving from said first bill receiving chamber towards said second bill receiving chamber; and a bill payout mechanism provided in said bill pushing member and having a bill conveying member exposed on at least said first surface of said bill pushing member, a bill which is in contact with said bill conveying member being fed to said bill outlet by driving said bill conveying member.

2. A bill receiving device as defined in claim 1 wherein said first and second bill receiving chambers respectively have said bill outlet and said bill conveying member is exposed respectively on said first and second surfaces of said bill pushing member.

3. A bill receiving device as defined in claim 1 further comprising control means for positioning, when a bill is paid out of said first bill receiving chamber, said bill pushing member at a predetermined position at which said first surface of said bill pushing member comes into pressing contact with a surface of a stack of bills in said first bill receiving chamber and feeding a bill which is in contact with said bill conveying member to said bill outlet by driving said bill conveying member in this state.

4. A bill receiving device as defined in claim 2 further comprising:

first control means for positioning, when a bill is paid out of said first bill receiving chamber, said bill pushing member at a first predetermined position at which said first surface of said bill pushing member comes into pressing contact with a surface of a stack of bills in said first bill receiving chamber and feeding a bill which is in contact with said bill conveying member to said bill outlet in said first bill receiving chamber by driving said bill conveying member in this state; and second control means for positioning, when a bill is paid out of said second bill receiving chamber, said bill pushing member at a second predetermined position at which said second surface of said bill pushing member comes into pressing contact with a surface of a stack of bills in said second bill receiving chamber and feeding a bill which is in contact with said bill conveying member to said bill outlet in said second bill receiving chamber by driving said bill conveying member in this state.

5. A bill receiving device as defined in claim 1 wherein said bill payout mechanism comprises said bill conveying member consisting of rollers and a motor for driving these rollers.

6. A bill receiving device as defined in claim 1 wherein bills of one specific denomination are received in said first bill receiving chamber and bills of other denomination or denominations are received all together in said second bill receiving chamber.

7. A bill receiving device as defined in claim 6 wherein said bills received in said second bill receiving chamber comprise a credit voucher.

8. A bill receiving device as defined in claim 2 wherein bills of one specific denomination are received in said first bill receiving chamber and bills of another specific denomination are received in said second bill receiving chamber.

* * * * *